Nov. 5, 1935.  A. P. STECKEL ET AL  2,019,741
GAUGING APPARATUS
Filed Jan. 16, 1933
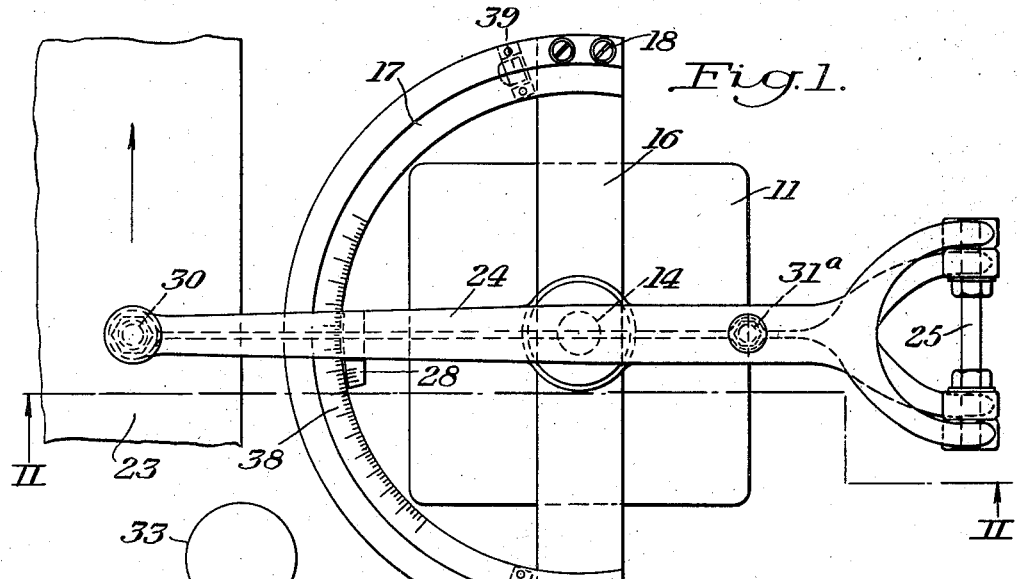
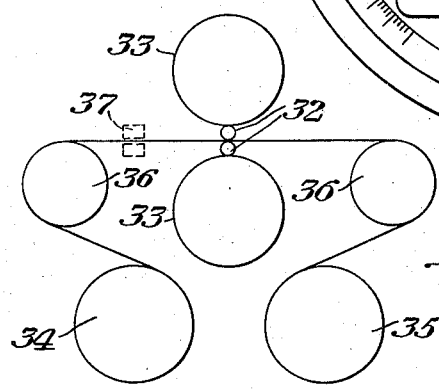
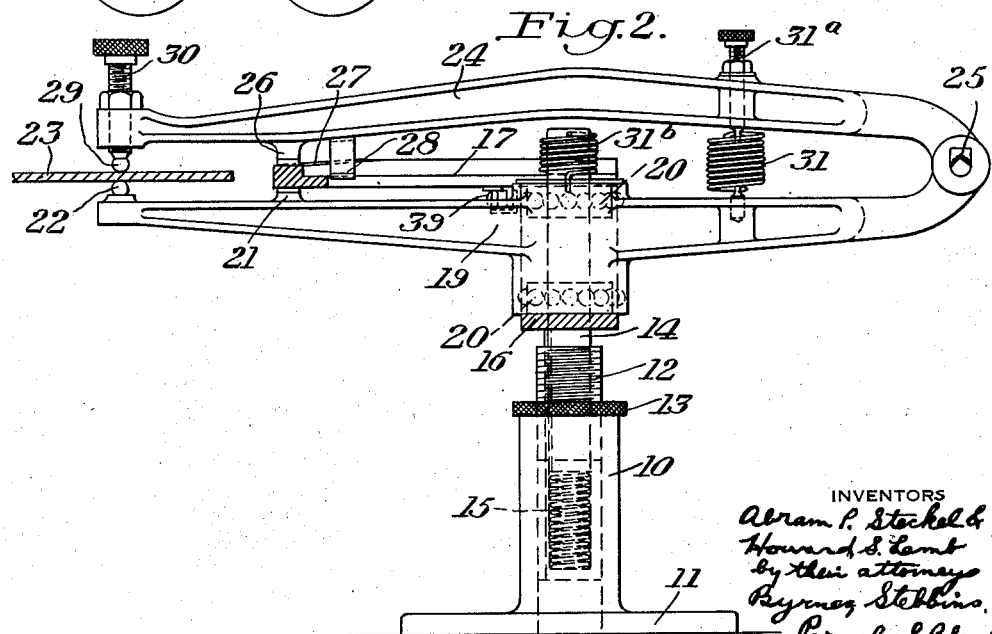
INVENTORS
Abram P. Steckel &
Howard S. Lamb
by their attorneys
Byrnes, Stebbins,
Parmelee & Blenko.

Patented Nov. 5, 1935

2,019,741

UNITED STATES PATENT OFFICE 2,019,741

GAUGING APPARATUS

Abram P. Steckel and Howard S. Lamb, Youngstown, Ohio, assignors to The Cold Metal Process Company, Youngstown, Ohio, a corporation of Ohio Application January 16, 1933, Serial No. 651,956

4 Claims. (Cl. 33—148)

Our invention relates to a device for gauging the thickness of material and, in particular, to a device for providing a continuous indication of the thickness of moving material in long lengths.

Numerous devices for continuously gauging moving material, of course, have been known heretofore. It is a particular object of our invention, however, to provide a novel form of gauge which is simple in construction and yet sturdy enough to withstand the rather severe usage to which devices of this kind are subject in normal service. The invention is applicable chiefly to uses where extreme accuracy of measurement is not essential.

In accordance with our invention, we provide hinged arms somewhat on the order of calipers, which are pivoted for limited rotation. Resilient means, such as a spring, is employed to urge the arms of the caliper toward each other. The device is positioned so that the arms bear upon opposite surfaces of a sheet or plate, the thickness of which it is desired to measure. An inclined track is effective for slowly opening the caliper arms as they rotate on their pivot. A spring opposes rotation of the arms. By this means, the frictional effect of the material passing between the arms is sufficient to rotate the latter through a predetermined angle until the arms are separated to an extent such that the frictional effect of the moving material is exactly balanced by the torque of the resetting spring.

For a complete understanding of the invention, reference is made to the accompanying drawing illustrating a present preferred embodiment. In the drawing:

Figure 1 is a top plan view of the invention;

Figure 2 is a sectional view substantially along the line II—II of Figure 1 with parts being shown in elevation; and Figure 3 is a diagrammatic view illustrating the position of the device when used in connection with a known type of four-high mill for cold rolling strip steel.

Referring now in detail to the drawing, the device comprises a column 10 resting on a base 11. A socket 12 is vertically adjustable in the column 10 by means of a knurled collar 13 threaded thereon. The socket 12 carries a post 14 supported therein on a compression spring 15. The post 14 is secured against rotation in any convenient manner and is provided with a crosshead 16 adjacent its upper end. A graduated circular segment 17 is secured to the ends of the crosshead by screws 18. A caliper or micrometer arm 19 is pivoted on the post 14 by means of anti-friction bearings 20. The arm 19 has a shoe 21 sliding on the lower surface of the segment 17, and a contact ball 22 adapted to engage the lower surface of a piece of moving material 23. A second caliper or micrometer arm 24 is pivoted to the arm 19 at 25. The arm 24 has a shoe 26 sliding on the upper surface of the segment 17 which is provided with a slight incline indicated at 27. A graduated segment 28 is also mounted on the the arm 24 for cooperation with the graduated segment 17. A contact ball 29 is adjustably supported on the arm 24 by a screw 30 to engage the upper surface of the material 23. A tension spring 31 tends to maintain the caliper arms in contact with the material. An adjusting screw 31a permits adjustment of the spring tension. A second spring 31b has one end secured to the post 14 and the other to the arm 19, and its effect is to exert a torque on the arms tending to turn them in a counterclockwise direction.

The invention is particularly useful in connection with a mill for rolling strip in long lengths. A mill of this type, known in the art as a four-high reversing mill, is indicated schematically in Figure 3. The mill comprises working rolls 32 and backing rolls 33, the latter being preferably mounted in anti-friction bearings. Winding and unwinding reels 34 and 35 are employed to draw a strip back and forth through the mill over the guide rolls 36. It is desirable, of course, to known the gauge of all the portions of the strip as it passes through the mill in order that the screwdowns thereof may be properly actuated. For this purpose, the device of our invention may be installed as indicated in dotted lines at 37 in Figure 3, representing the end elevation of the caliper arms in position for engaging the strip or other material, such as that shown at 23.

In operation, the caliper arms are opened, for example, manually, to receive the material 23, or the material itself may be in motion before the caliper arms are swung into engagement therewith. At any time during the movement of the material, however, the frictional effect of the latter on the arms 19 and 24 through the contact balls 22 and 29 will be to turn the arms in a clockwise direction, if it is assumed that the material moves in the direction of the arrow shown in Figure 1. The rotation of the arms by their frictional engagement with the material is opposed by the torque of the spring 31b which, of course, increases as the arms are rotated clockwise. Such rotation, furthermore, tends to spread the arms by reason of the engagement of the shoe 26 of the arm 24 with the inclined portion 27 of the segment 17. It will be apparent that, for a predetermined adjustment of the springs 31 and 31b, the arms 19 and 24 will be swung simultaneously to a position which will vary with the thickness of the material 23 which, of course, determines the magnitude of the frictional force tending to rotate the arms against the torque of the spring 31b. The segments 17 may thus be calibrated so as to read the thickness of the material 23 directly from a scale 38 by means of the movable scale 28.

Resilient bumpers 39 on the segment 17 serve as stops to prevent rotation of the arms 19 and 24 through an angle of more than about 160°.

It will be apparent from the foregoing description that our invention provides a relatively simple gauger having sufficient accuracy for many uses, characterized by rigid construction and comparatively low cost. The device is direct reading and can be made quite sensitive. It is particularly effective in indicating departures from a constant gauge of the material passing therethrough. If the thickness of the material increases, the caliper arms are swung clockwise until the resulting separation of the arms restores the balance between the frictional effect of the moving material on the contact balls and the torque of the resetting spring 31b. The contact balls are preferably made of hardened steel to resist wear. It should be noted, however, that even should the balls wear considerably, the accuracy of the device is not substantially affected since the frictional effect of the moving material on the arms is not changed greatly by the wearing of the balls. Compensating adjustment of the springs 31 and 31b may be made to maintain the accuracy of the device.

Although we have illustrated and described herein but a single preferred embodiment of the invention, it will be apparent that many changes in the device as illustrated and described may be made without departing from the spirit of the invention or the scope of the appended claims.

We claim:

1. A device for continuously gauging material having longitudinal movement in a plane, comprising a post perpendicular to said plane, a pair of caliper arms on said post engaging the material frictionally, said caliper arms being rotatable about said post in said plane and openable in planes perpendicular to said first-mentioned plane, means for spreading the arms on rotation thereof by frictional engagement with said material, and means for yieldingly opposing such rotation.

2. A device for gauging moving material comprising a pair of calipers, means supporting said calipers for swinging movement as a unit, means responsive to such swinging movement for separating said calipers, including a wedge segment, and means normally tending to close the calipers.

3. A device for continuously gauging moving material, comprising a pair of calipers hinged on a common axis, means supporting the calipers for rotation in a plane parallel to said axis, means causing the calipers to grip material moving therebetween, means supporting the calipers for limited movement with the material, means yieldingly opposing such caliper movement, and means responsive to such caliper movement for separating the calipers in proportion to their said movement to balance the frictional force of the moving material thereon and the force opposing caliper movement, at a predetermined position of the calipers for each particular gauge.

4. Apparatus for continuously gauging strip material moving in a predetermined plane, comprising a post perpendicular to said plane, a pair of calipers hinged for opening and closing movement in a plane containing the axis of said post, whereby to engage the material on opposite sides, said calipers being mounted for rotation on said post, means for normally urging the calipers to closed position, and means effective on swinging movement of the calipers resulting from the frictional engagement thereof with the material, for separating the calipers.

ABRAM P. STECKEL.
HOWARD S. LAMB.